US006931293B1

United States Patent
Douglas et al.

(10) Patent No.: US 6,931,293 B1
(45) Date of Patent: Aug. 16, 2005

(54) METHOD FOR EARLY OPTIMIZATION OF A MANUFACTURING SYSTEM DESIGN

(75) Inventors: Michael Douglas, Brighton, MI (US); Edward Kornas, Waterford, MI (US); Mariann Anticoli, Bloomfield Hills, MI (US); Barbara J. Sullins, Waterford, MI (US); Enju Liang, Troy, MI (US); Maria Rocio Mirto, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 884 days.

(21) Appl. No.: 09/656,677

(22) Filed: Sep. 7, 2000

(51) Int. Cl.[7] ............................................. G06F 19/00
(52) U.S. Cl. ................................ 700/97; 700/95; 703/1
(58) Field of Search ............................ 700/90, 95, 97, 700/105; 705/1; 703/1

(56) References Cited

U.S. PATENT DOCUMENTS

| | | | | |
|---|---|---|---|---|
| 5,355,317 A | * | 10/1994 | Talbott et al. | 700/97 |
| 5,377,116 A | * | 12/1994 | Wayne et al. | 700/175 |
| 6,249,714 B1 | * | 6/2001 | Hocaoglu et al. | 700/97 |
| 6,253,115 B1 | * | 6/2001 | Martin et al. | 700/97 |
| 6,292,707 B1 | * | 9/2001 | Hair et al. | 700/97 |
| 6,714,827 B1 | * | 3/2004 | Brown et al. | 700/97 |
| 6,725,183 B1 | * | 4/2004 | Cawse | 703/2 |
| 2002/0007348 A1 | * | 1/2002 | Ali et al. | 705/51 |

* cited by examiner

Primary Examiner—Jayprakash N. Gandhi
(74) Attorney, Agent, or Firm—Cary W. Brooks

(57) ABSTRACT

A method for designing manufacturing systems with speed, flexibility, continuity includes identifying design issues with respect to at least one system concern (e.g., safety, reliability, quality, etc.) at the beginning of the design process. Proposed designs are evaluated according to simultaneous and sequential criteria both during a preliminary stage, before a supplier has been selected, and after a selected supplier offers a more detailed design for the manufacturing equipment. The activities and associated consequences associated with maintaining and operating the equipment being designed are identified and paired together into activity/consequence pairs. An optimized solution is determined for each individual activity/consequence pair and incorporated in the manufacturing equipment's design. After the manufacturing equipment is built, a validation process confirms that the process considerations and process solutions with respect to the particular system concern have been resolved in the final product. By considering process issues early in the design stage, the manufacturing equipment is less likely to require retrofitting in response to process issues discovered later after the manufacturing equipment has been built.

42 Claims, 5 Drawing Sheets

METHOD FOR EARLY OPTIMIZATION OF A MANUFACTURING SYSTEM DESIGN

TECHNICAL FIELD

The present invention relates to the field of manufacturing system design, procurement and implementation, and more particularly to a method for optimizing a manufacturing system by both simultaneous and sequential application of optimized system criteria.

BACKGROUND OF THE INVENTION

Designing and building manufacturing systems (e.g., equipment, processes, devices, etc.) require consideration of many system concerns, such as quality, reliability and health/safety of users, and often use various discrete methodologies for addressing each concern. These concerns often have various methodologies and specifications themselves that are considered "best practices", that is, methodologies and specifications that are considered optimal for accomplishing a particular task or achieving a particular result. Further, manufacturing systems ideally use the newest technology to implement the optimized practices. Current manufacturing systems, however, are often designed and even built before they are evaluated with respect to best practices and new technology specifications. Because these specifications are often numerous and detailed, the proposed manufacturing equipment/system design will likely require many design changes to address these specification details, increasing the overall time required to finalize any given design. Further, redesigning the equipment/system in an ad hoc increase cost due to redesign(s) later in manufacturing design, procurement, and implementation process (also referred to as a "manufacturing life cycle").

Currently known methods may address optimized practices relatively late in the manufacturing life cycle, often after an initial design has been completed and even after the manufacturing system has already been built. As a result, known methods require at least some degree of retrofitting on an existing system, even when the system is new, to accommodate best practice and new technology solutions that were not addressed in the system's original design. In some cases, the system is already partially built according to design specifications before proper design reviews occur. These situations typically require modification of the equipment to accommodate any changes suggested or required by the inspectors and re-testing. This process increases opportunities for errors in both the physical structure of the equipment and the equipment's electronic circuitry.

Because incorporating optimized design details after an initial design has been completed and/or after the equipment has been partially or completely built is cumbersome and expensive, there is a need for a manufacturing process that integrates optimization considerations early in the manufacturing life cycle.

SUMMARY OF THE INVENTION

Accordingly, the present invention is a method for identifying and incorporating best practices features in the design, procurement and implementation of a manufacturing system (e.g., equipment, process, device, etc.) throughout a manufacturing life cycle. The method generally includes the steps of reviewing a manufacturing system design based on design analysis data at different times during a manufacturing life cycle, conducting an activity-focused assessment during a procurement phase of the process, and validating the final design once the manufacturing system has been built and installed at its final location. The data obtained during the design review and assessment steps can be recorded in a database for use in existing and future manufacturing system designs.

As a result, the inventive method provides continuity between designers, suppliers and users during the manufacturing system design, procurement and implementation process by considering specific, activity-focused issues early in the process, and throughout the entire manufacturing life cycle, thereby providing total integration and reducing costly and time-consuming modifications and retrofits in later stages of the process.

DETAILED DESCRIPTION OF THE PREFERRED EMBODIMENTS

Figure 1:
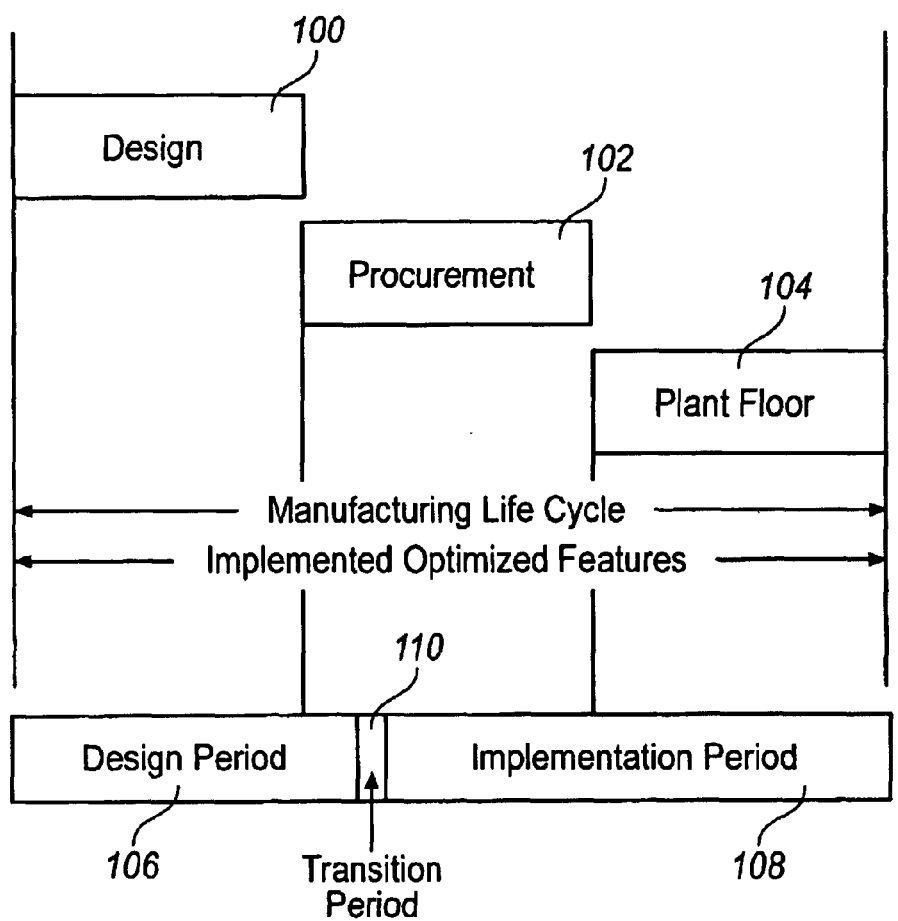
FIG. 1 is an explanatory diagram illustrating a manufacturing life cycle in which the inventive method is implemented.

FIG. 1 illustrates an overview of a manufacturing system design, procurement and implementation process (a "manufacturing life cycle"), which provides the context in which the inventive method takes place. As can be seen in the Figure, a typical manufacturing life cycle can be divided into three phases: a design phase 100, a procurement phase 102, and a plant floor phase 104. The design phase 100 refers to system design activities occurring before a system supplier is selected (e.g., preliminary design tasks, obtaining quotes from potential suppliers, and awarding a purchase order to a selected supplier), while the procurement phase 102 refers to design activities occurring at the system supplier after the supplier has been selected (e.g., detailed design, building or purchasing of equipment by supplier, and design acceptance). The plant floor phase 104 refers to activities occurring after the equipment has reached its end destination (e.g., installation, debugging, and final production run). As indicated in the Figure, optimized features are implemented over the entire manufacturing life cycle, during the design, procurement and implementation phases 100, 102, 104, rather than only in an ad hoc manner during the later stages, as in commonly observed methods.

The three phases 100, 102, 104 can collectively be viewed as falling either within a design period 106 or an implementation period 108, which are separated by a transition period 110 during which the design is transitioned into hardware. During the design period 108, which encompasses the entire design phase 100 and a portion of the procurement phase 102, the optimized features are incorporated into the manufacturing system's design, before the supplier even begins building the system. The actual implementation of the optimized design features occurs during the transition period from design to hardware 110. After implementation, any redesign or modification of the manufacturing system occurs during the implementation period 108; this time period is often used to fine-tune any lingering design issues occurring after the design has been put into practice. Note that for systems designed according to the inventive method, the amount of retrofitting required will likely be minimal or even non-existent.

Figure 2:
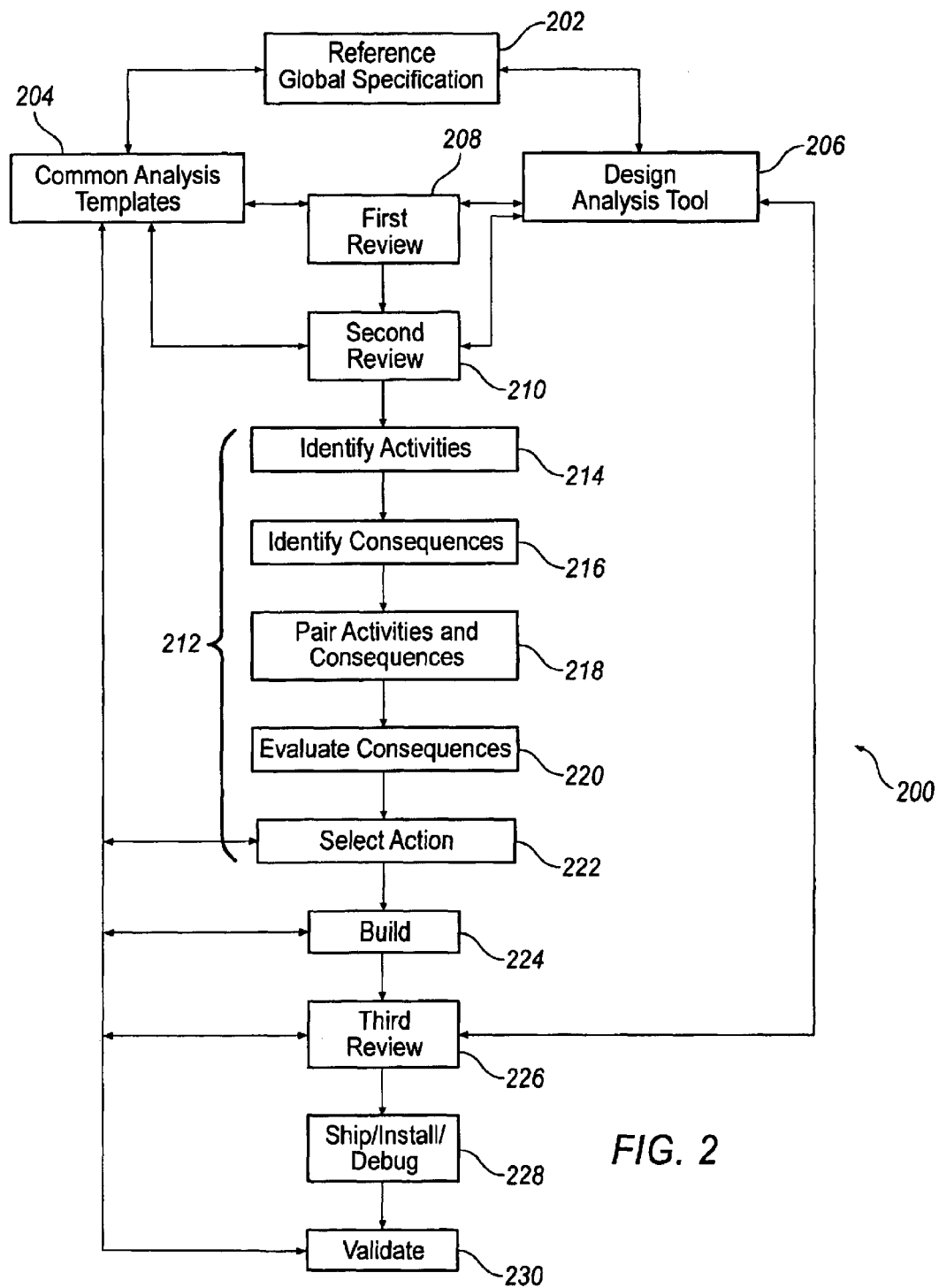
FIG. 2 is a flowchart illustrating one embodiment of the inventive method.
Figure 3:
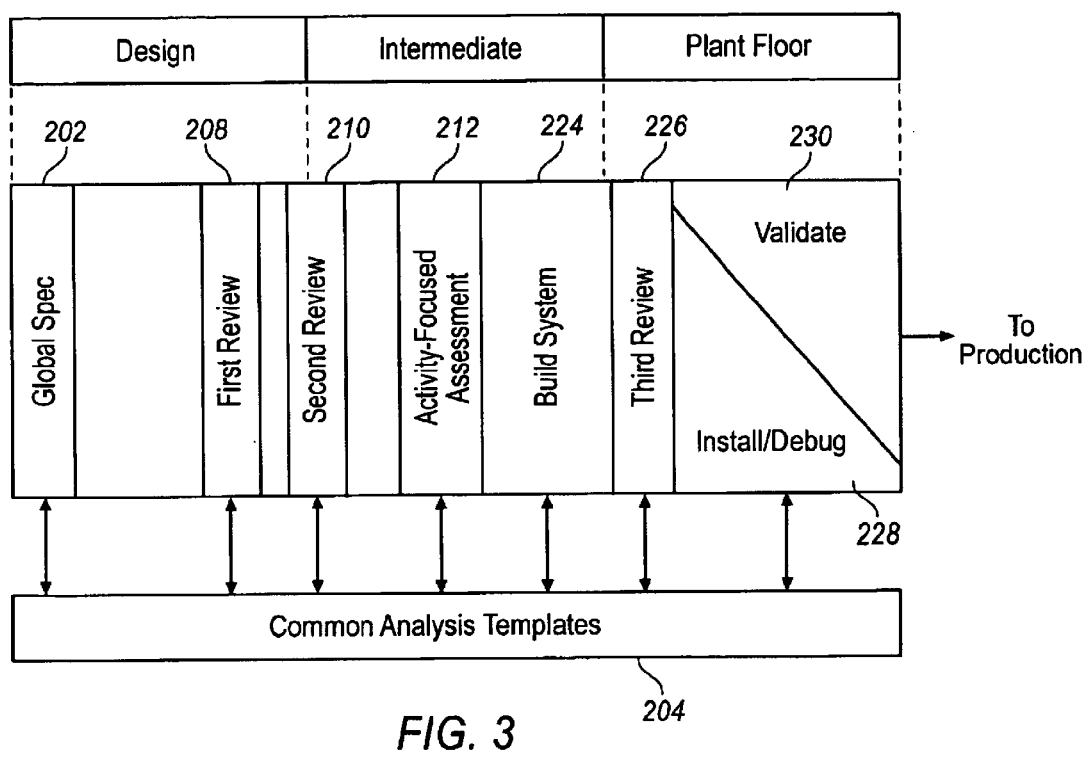
FIG. 3 is an explanatory diagram illustrating the simultaneous and sequential relationship between the inventive method and the manufacturing life cycle.

Referring to FIGS. 2 and 3, the inventive method involves using a common, consistent approach for implementing optimized design features into new systems and for retrofitting existing systems. The three main elements of the inventive method are design reviews, activity-focused assessments, and validation. FIG. 2 is a functional flowchart of the inventive method, while FIG. 3 illustrates the synchronization between the inventive method and the manufacturing design, procurement and implementation process. Referring to FIG. 2, the inventive process 200 begins by referencing a global specification at step 202, which includes core requirements for the specific manufacturing system to be designed and developed. As can be seen in FIG. 2, the global specification 202 receives input from common design analysis templates 204, which contains best practices information that is common to multiple new manufacturing system designs. The global specification 202 is also preferably continuously updated based on feedback from new product program implementations, design analysis data and activity-focused assessment data (described in greater detail below) so that the global specification 202 reflects the most recent optimization and new technology information available.

Design reviews in the inventive method 200 are preferably conducted using a system-specific design analysis tool, which includes information regarding optimization issues relevant to the particular manufacturing system being designed, at step 206. The design analysis tool at step 206 is created from information in the global specification 202 and is also itself used, via the design reviews at steps 208 and 210, to update the global specification 202 for future design use. Generally, the design analysis tool includes tailored questions based on the global specification 202 and is a combined checklist and documentation of the optimization issues with respect to one or more system concerns in a given piece of manufacturing equipment.

For example, the design analysis tool 206 can be arranged as a list of criteria corresponding to requirements listed in the manufacturing system's specification, with the criteria focusing on optimizing at least one system concern (e.g., safety, reliability, quality, etc.). The list format of the design analysis tool 206 makes comparing the manufacturing system design with the tool 206 much simpler than comparing the design directly with the global specification 202. The design analysis tool 206 requires engineers to document optimized features of a given system in detail according to the global specification 202 and compare them to the common analysis template 204 to ensure that the design analysis tool 206 sets criteria for all optimization parameters in manufacturing system with respect to a particular system concern. Preferably, the design analysis tool 206 is generated using input from controls engineers, manufacturing engineers, selected suppliers, and any other parties involved in the design and implementation process to ensure that the parameters in the design analysis tool 206 are complete before the actual design process begins.

Once the program specific analysis tool is completed at step 206, the process moves to a first, "pre-award" design review at step 208. This first review step 208 is preferably conducted after the design analysis tool 206 has been completed for the new manufacturing system design, but before supplier quotes are requested. The primary purpose of the first design review 208 is to highlight any optimization issues early in the manufacturing process based on any available information about the manufacturing equipment to be designed. Criteria for evaluating suggestions from suppliers can be developed during the first design review 208 as well.

The first design review 208 can also be conducted after supplier quotes are received if an alternative design approach is considered. If this occurs, the design analysis tool 206 is used to analyze the alternative design approach and, if needed, incorporate the alternative design data in the design analysis tool 206. This revisiting of the design analysis tool 206 during the design review step 208 is indicated in FIG. 2 by the double-headed arrow between the first review step 208 and the design analysis tool step 206. To provide continuous improvement, the updated information from the pre-award design review step is provided both to the common templates 204 and the program-specific analysis tool 206 so that the new information can be used in future manufacturing system designs. Because the manufacturing system design is in its early stages at this point, it is likely that not all of the criteria in the design analysis tool list 206 will be addressed during the first design review 208.

Once the first design review step 208 is complete, the method proceeds to a second, "detailed design" design review step 210. This step 210 occurs after a design supplier has been selected and preferably after the design process has progressed somewhat to address a greater number of criteria in the design analysis tool 206. The common analysis templates 204 may also be updated based on information obtained during the second review 210 for use in future designs, to promote continuous improvement.

Next, the method proceeds to an activity-focused assessment phase 212. The activity-focused assessment phase 212 is preferably conducted on new system designs that have proceeded through the first and second design reviews, 208, 210 and are near the end of the engineering design phase. To minimize future retrofits, the activity-focused assessment phase 212 is preferably conducted before the supplier begins building the equipment. Note that once the new manufacturing equipment has completed the activity-focused assessment phase 212, the same system design resulting from the assessment phase 212 can be applied to as many facilities as needed because a comprehensive assessment of the design has already been completed. If design modifications in the system are required because of differences in the physical dimensions between different facilities or differences in program requirements, the modified design should undergo a second activity-focused assessment phase 212 with respect to the modifications only.

Generally, the activity-focused assessment phase 212 of the inventive method 200 is a systematic way to evaluate all activities associated with a given manufacturing system, and their corresponding consequences as defined by the specific system concern (e.g., health/safety, quality, reliability, etc.) being optimized. For example, in a health/safety context, the activity-focused assessment phase 212 would involve identifying each task (i.e., the "activity") involved in the operation and maintenance of the manufacturing system being designed and any risks or hazards (i.e., the "consequence") associated with each task. Activity and consequence identification and are preferably conducted by a group of people who are identified as having experience with the work environment/equipment being analyzed in the desired context.

The inventive method will be described in greater detail below using the health/safety context as an example. The Safety 21(™) process designed by General Motors Corporation is one example of such a method. Note that if the inventive method is used to evaluate a different system concern (e.g., quality, reliability, etc.), or a different manufacturing system, the specific people chosen to provide input and the specific activities and consequences identified during the process will change, but the overall process 200 remains the same. During the activity-focused assessment phase 212, input is solicited from personnel who will actually be operating, maintaining, designing and building the new manufacturing system. To generate the information needed during the activity-focused assessment phase 212 in a health/safety context, for example, a team of individuals who are familiar with the manufacturing system requirements is assembled to discuss and uncover any health and safety issues they encounter during the course of their daily work as well as obtain any suggestions for improving the manufacturing system design based on their collective experience with existing systems. The team preferably includes people at many different levels, including engineers, plant hourly personnel, and safety representatives. By obtaining data in this manner, the preferred embodiment of the inventive method can combine anecdotal evidence, documentation, and group analysis to pair activities and their associated consequences together in a quick, efficient manner.

The design analysis tool 206 is preferably used to direct the team discussions through the steps in the activity-focused assessment phase 212 to generate answers that will be entered into an activity-focused assessment tool for evaluation. As noted above, the design analysis tool 206 is preferably a document that provides the manufacturing system specification information in criteria list form; using the design analysis tool 206 to direct the activity-focused assessment phase 212 will ensure that all activities and their associated consequences will be addressed. In the health/safety context, the team first identifies and documents all tasks involved in maintaining and operating the manufacturing equipment at step 214. Because the team members are selected from a cross-section of experienced workers, the resulting activity list will most likely be comprehensive based on the input from the workers' collective experience. The information about the activities can be as broad or as detailed as desired. In the health/safety context, for example, the activity description may identify whether the activity is conducted by maintenance personnel or operator personnel, identify the major equipment used in the task, whether the activity is performed during a manufacturing shift, whether the manufacturing process needs to be stopped to perform the activity and, if so, the time required for lockout and restart, the time required to complete the activity, and the frequency in which the activity needs to be performed. These categories can be eliminated, augmented, or otherwise changed to reflect the specific system for which the inventive method is applied and the specific concern being evaluated and optimized.

The next step involves identifying and documenting all consequences associated with maintaining and operating on the manufacturing equipment or system (step 216). In the health/safety context, for example, the "consequences" would be any hazards encountered when operating or maintaining the system being evaluated. In other contexts, the consequences associated with a given activity may include areas where unnecessary costs may be incurred or events that would negatively impact the system's quality.

Next, the team creates activity/consequence pairs by matching each activity with all of its associated consequences (step 218). Note that, depending on the thought process of the team, the activity/consequence pairs may develop naturally during the consequence identification step 216. Some activities may have more than one associated consequence.

Once the activity/consequence pairs have been identified 218, the team members are asked to consider evaluation questions for each individual activity/consequence pair at step 220. These questions are meant to identify possible optimal solutions for each activity and consequence with respect to the specific concerns (e.g. safety, reliability, etc.). For each activity/consequence pair in the health/safety context, for example, the team should consider whether the task itself can be changed, whether the task is minor or major (i.e., whether performance of the task requires shutting down the manufacturing equipment), whether the hazard can be eliminated altogether, whether there is an existing equipment control solution to the hazard (such as lockout or system monitoring), and whether the severity of the injury is high according to predetermined standards (e.g., whether the injury is recordable under OSHA). These evaluation questions help the team focus on the issues raised by the activity-focused assessment questions to ensure that all possible solutions for addressing each individual consequence have been raised and documented.

After the consequences have been evaluated for each activity at step 220 by the team, the evaluation responses are entered into an activity-focused assessment software tool to generate a recommended action at step 222 for each activity/consequence pair. In the health/safety context, for example, the recommended action for each activity/consequence pair will fall into one of three categories: lockout, control reliable method, and other safety measures. "Lockout" refers to shutting down the electrical system of the manufacturing equipment as a response to the hazard, and more particularly to disconnecting the manufacturing equipment from its energy source and removing the power to the equipment to stop equipment operation. "Control reliable method" refers to an alternative method for addressing safety issues in the operation or maintenance of the manufacturing equipment without shutting down the equipment completely. "Other safety measures" covers other possible solutions that are not addressed by the first two categories (e.g., training, personal protective equipment for the employee, guardrails, ventilation, etc.). Of course, in other contexts, the recommended action categories will vary depending on the specific system concern being addressed by the inventive method.

The activity-focused assessment software tool used in the inventive method preferably uses a hierarchy of preferred solutions, which governs the selection of appropriate actions to select the optimal solution for a given activity/consequence pair. For example, in the health/safety context, the activity-focused assessment software tool uses a known hierarchy of health and safety controls to eliminate or reduce the risk caused by a given hazard. The hierarchy itself ranks the types of solutions, from most desirable to least, from which the activity-based assessment tool selects an action corresponding to a given activity/consequence pair according to criteria that is relevant to the system concern being optimized. In the health/safety context example, the hierarchy in the activity-based assessment tool aims to minimize the amount of human involvement, from the worker's perspective, required to implement a particular solution. Regardless of the specific concern being addressed by the inventive method, the logic of the activity-based assessment tool should evaluate each activity/consequence pair according to a series of yes/no evaluation questions and use the answers to those questions to direct the tool toward the highest ranking (and therefore most-preferred) solution in the hierarchy that satisfies all of the answers to the evaluation questions. The highest-ranking solution will then be selected by the tool as the action corresponding to the given activity/consequence pair and is recorded in the activity-focused assessment summary. The results from the design reviews and the activity-focused assessments can themselves be used to develop safe operating procedures.

The specific information obtained from the activity-focused assessment phase 212 can be categorized by the specific equipment in the system being evaluated and then by the specific activities associated with that equipment in an assessment summary. Continuing with the health/safety example, a description of any potential hazards associated with each activity can be included in the activity-focused assessment summary. For example, a potential slip/trip hazard is associated with replacing a brake or motor in a lift elevator. The assessment summary may also include the evaluation questions, which were explained above, to address possible ways in which the identified hazards can be addressed. In the case of the lift elevator example, the evaluation questions indicate that the task is associated with an equipment change, that there is no equipment control solution available, and that the potential severity of the hazard is high. The summary also includes the assessment tool output and a more detailed explanation of the output; the assessment tool output column in the health/safety context, for example, places the proposed safety solution in the "lockout", "control reliable method", or "other solution" category and further describes the nature of the safety solution in a detailed output column. The action portion of the assessment summary provides additional detail about the final action proposed by the activity-based assessment tool for optimizing the solution the specific activity/consequence pair. Referring back to the lift elevator example, the activity-focused assessment tool may recommend training and possibly a man-elevator to address the slip/trip hazard. The "validation date" column is provided in the assessment summary generated by the tool to record and confirm that each item in the assessment summary has been validated in the validation step, which will be explained in greater detail below.

Any information obtained from the action step 222 in the activity-focused assessment phase 212 is also sent to the program-specific analysis tool 206 and to the common template 204 to improve future designs. After the activity-focused assessment phase 212 is complete, the assessment summary output by the activity-focused assessment tool is sent to the appropriate parties, such as the supplier and/or engineering groups, for consideration and implementation in the manufacturing system design.

Once the activity-focused assessment phase 212 is complete, the supplier is authorized to begin building the new manufacturing equipment based on the finalized system and layout drawings at step 224. These finalized drawings will have incorporated all of the design features according to the information obtained from the previous two design reviews 208, 210 and the suggested actions generated by the assessment tool in the activity-focused assessment phase 212. Because the optimization issues with respect to selected system concerns (e.g., health/safety, reliability, quality, etc.) have been addressed throughout the design process since the beginning, the system design itself already has taken externally-imposed optimization requirements as well as any features suggested by the assessment tool and by team members during the activity-focused assessment phase 212. Thus, the final system requires few, if any, modifications once it has been built and installed. If there are any other issues that arise during the building step 224, they are incorporated into the common design analysis template 204 for reference in existing and future designs.

After the supplier builds the equipment, the equipment undergoes a third, "buyoff" design review at step 226, during which the design analysis tool 206 is used to verify that the various design features highlighted during the previous two design review steps 208, 210 and the activity-focused assessment phase 212 are present in the finished equipment. Information obtained during the third design review 226 can also be sent to the common templates 204 and to the design analysis tool 206 for use in existing and future designs.

After the third design review 226 is complete, the method proceeds to a ship/install/debug step 228, during which the equipment is shipped to the plant location and installed. The ship/install/debug step is the first step in the plant floor phase 104 of the inventive method. Once the equipment has been installed and debugged, the process moves to a validation step 230, which includes inspecting and testing the manufacturing equipment to ensure that it meets defined energy control requirements and all other standard design requirements as well as the recommendations obtained during the activity-focused assessment phase 212. For example, in the health/safety context, the validation step 230 may highlight the "lockout", "control reliable method", and "other safety measures" safety recommendations from the activity focused assessment phase 212 to confirm that these safety issues have been addressed adequately in the finished manufacturing system.

The validation step 230 is preferably conducted at the plant site after installation to confirm that the key optimization features highlighted during the activity-focused assessment process have been incorporated into the equipment. The equipment will be evaluated using the outputs obtained during the assessment phase 212 to confirm whether the features in the equipment design and operation exist as intended with respect to a specific activity/consequence pair. The assessment data used to conduct the validation step 230 is preferably sorted to verify easily that all activities and consequences have been addressed in the equipment's design and/or the equipment's operating procedures.

FIG. 4 illustrates one embodiment of a validation step 230 according to the inventive method using the health/safety context example. Note that the validation process in the invention is generally the same regardless of the specific characteristic being optimized and evaluated; the process generally involves checking each action item on the activity-based assessment summary with the manufacturing system to confirm that each action generated by the activity-based assessment tool has been implemented in the system.

The validation process begins after the activity-focused assessment data summary is complete 404 and after the manufacturing equipment has been installed at its final destination 406. The validation process in the health/safety context, for example, can be separated into two stages 400, 402. The first validation stage 400 verifies "lockout" and "control reliable method" solutions on the activity-focused assessment data summary, while the second validation stage 402 verifies the specific solutions categorized as "other safety measures". As shown in FIG. 4, the validation step first involves a field check of the lockout and associated lockout placards at step 408. This would include verifying that the placards properly describe and illustrate energy source locations, lockout points and procedures, verification procedures and associated safe operating procedures.

Once the field check of the lockout and associated lockout placards at step 408 is complete, the verification process checks whether control reliable method solutions are being used under certain conditions at step 410. If not, the process goes directly to step 412, where the method checks to see whether the equipment has satisfactorily "passed" its verification. If a control reliable method is being used as a safety solution, however, additional validation tests must be conducted at step 414 to ensure that the control reliable method meets all of its own safety design requirements during equipment operation.

After the lockout and the control reliable methods have been validated at steps 408 and 412, the inventive method checks to see if all of the validation results meet all of the safety requirements at step 412. If not, corrective action is taken at step 416 and the first stage of the validation process begins again at step 406. If, however, the manufacturing equipment functions properly during the lockout and control reliable method safety solutions, the activity focused assessment items associated with lockout and with control reliable methods are marked as complete at step 417.

Figure 4A:
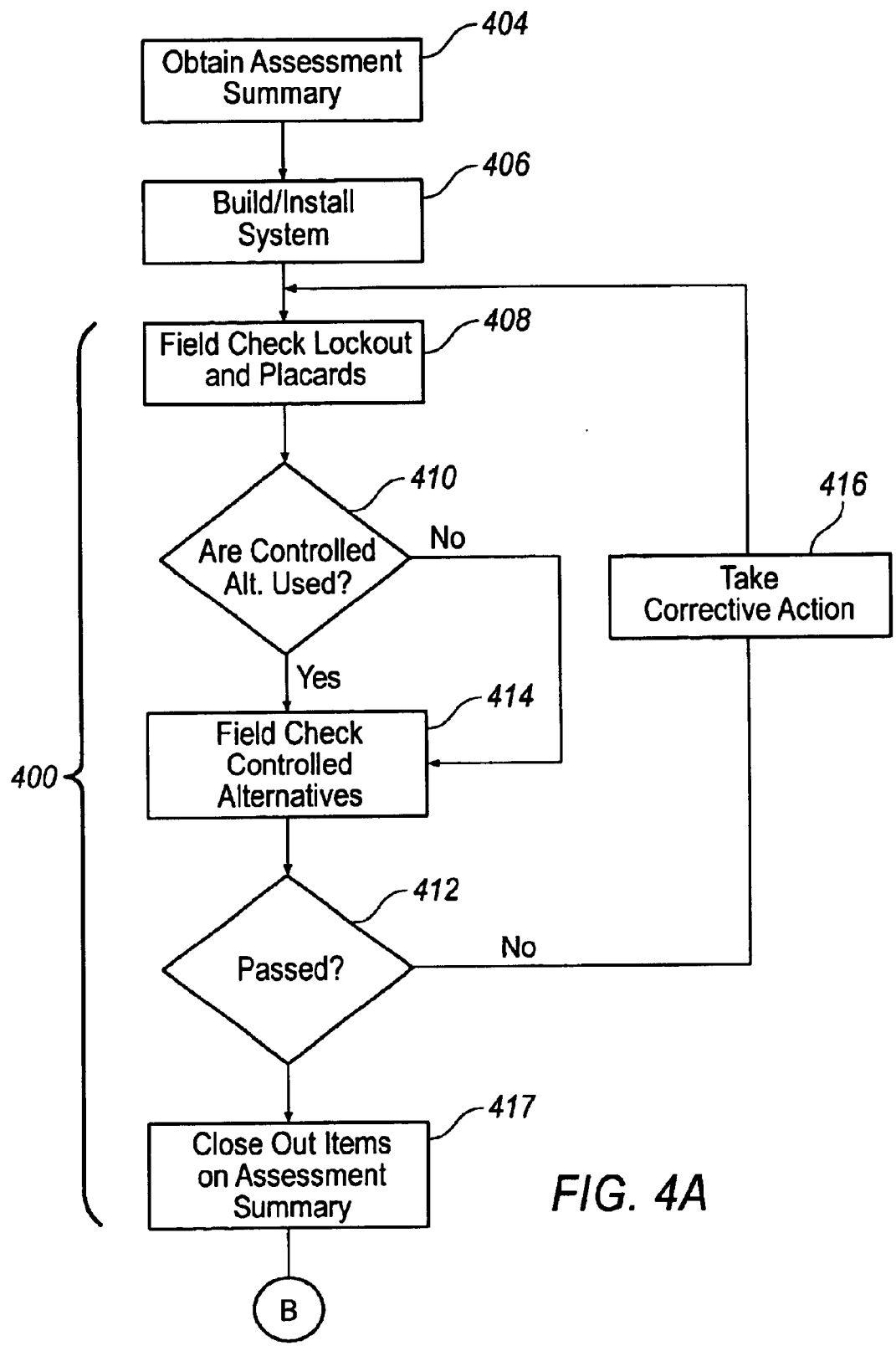
FIGS. 4A and 4B are flowcharts illustrating a validation process in accordance with the inventive method.
Figure 4B:
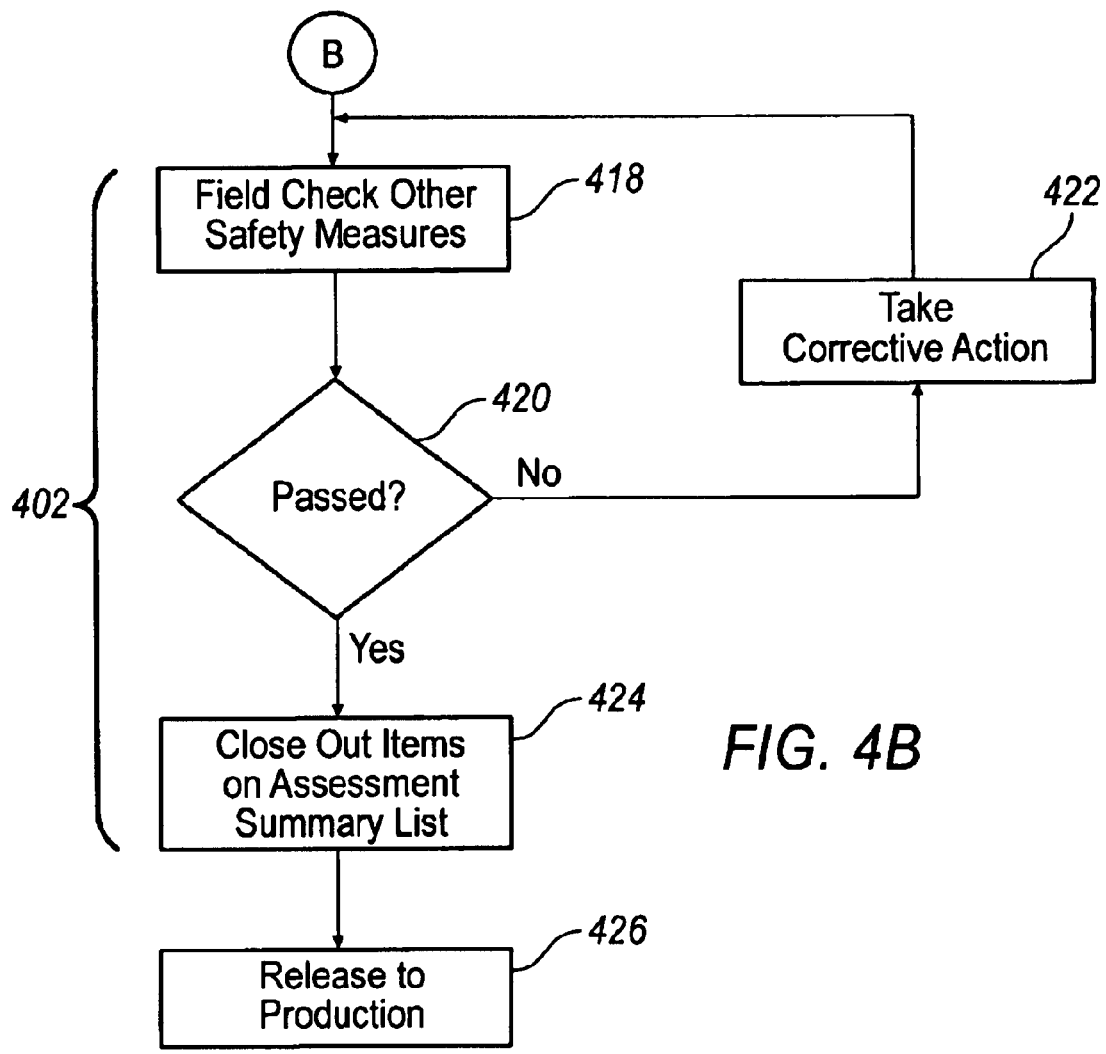

The second validation stage 402 can be conducted concurrently or sequentially with the first validation stage 400. FIGS. 4A and 4B illustrate a sequential process, but the processes shown in FIGS. 4A and 4B can be conducted at the same time if desired. During the second validation stage 402, all of the safety items listed on the risk assessment summary as "other safety measures" are inspected and verified at step 418. This stage generally includes checking the final placards for proper information, verifying that warnings, training, safe operating procedures, personal protective equipment, and other safety measures have been implemented, and generally checking each individual item on the risk assessment summary categorized under "other safety measures" to ensure they have been implemented.

After the other safety measures have been validated at step 418, the inventive method checks to see if all of the validation results meet all of the safety requirements at step 420. If not, corrective action is taken at step 422 and the first stage of the validation process begins again at step 418. If, however, all of the safety solutions have been properly implemented, the assessment items associated with "other safety measures" are marked as complete and closed out at step 424, thereby completing the validation process. If the equipment successfully completes both validation stages, the equipment is considered production-ready and released to production at step 426.

The inventive process ends after the validation step 230, indicating that the new equipment is ready for daily operation. Normally, a new piece of equipment that arrives at its end destination will stay at that destination for the remainder of its manufacturing life cycle. In some cases, the equipment may be removed after its life cycle is over for is retrofit purposes or if the equipment has exhausted its useful life. Retrofitting may be required to, for example, incorporate health and safety suggestions that were not addressed by the system's original design. Because the inventive process takes optimization issues with respect to one or more system concerns (e.g., safety, quality, reliability, etc.) into account during the design process, equipment designed according to the inventive method will require minimal, if any, retrofitting in the future to correct any issues that were not addressed in the original equipment design.

As a result, the inventive method applies dynamic tools that incorporate best practices, new technology, and externally imposed standards and regulations (e.g., ANSI, NSC, OSHA, ISO, etc.) into the early design stages of manufacturing systems, using a consistent methodology for evaluating and optimizing many different system characteristics. Completed activity-focused assessment summaries and design analysis tools are preferably maintained in a database so they can be referenced in the future for continuous improvement of system and equipment designs. The activity focused assessment steps can also be conducted apart from the other steps in the process on existing equipment and manufacturing systems to obtain information that can be added to the safety design analysis common template. Of course, for existing systems, the questions of changing tasks or eliminating hazards are not applicable because the equipment/system has already been built, cementing the required tasks and their associated hazards.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method for designing and building a manufacturing system during a system design, procurement and implementation process, comprising the steps of:
    reviewing a manufacturing system design according to design review data corresponding to a specification for the manufacturing system;
    conducting an activity-focused assessment of the manufacturing system design; and
    validating the manufacturing system based on results from the activity-focused assessment after the manufacturing system has been implemented.

2. The method of claim 1, wherein the reviewing step is conducted a plurality of times throughout the manufacturing design, procurement and implementation process.

3. The method of claim 2, wherein the reviewing step includes the steps of:
    conducting a first design review at a pre-design stage;
    conducting a second design review at a detailed design stage, wherein the second design review is conducted after a manufacturing system supplier has been selected; and
    conducting a third design review after the manufacturing system has been built.

4. The method of claim 1, wherein the design review data is in the form of at least one of a common analysis template and a system-specific analysis tool.

5. The method of claim 4, further comprising the step of updating at least one of the common analysis template and the system-specific analysis tool during the reviewing step.

6. The method of claim 1, wherein the conducting step includes the steps of:
    identifying activities associated with the manufacturing system;
    identifying consequences associated with each activity;
    pairing associated activities and consequences into activity/consequence pairs;
    evaluating each activity/consequence pair based on predetermined assessment criteria; and
    selecting an action for each activity/consequence pair.

7. The method of claim 6, wherein the assessment criteria corresponds to at least one system concern selected from the group consisting of reliability, quality, and health/safety.

8. The method of claim 6, wherein the validating step includes the steps of:
 comparing an actual action for each activity/consequence in the manufacturing system with its associated action from the selecting step; and
 taking corrective action if the actual action does not match the action from the selecting step.

9. The method of claim 1, wherein the validating step includes the steps of:
 comparing discrete areas of the manufacturing system with the results from the activity-focused assessment step; and
 taking corrective action if any of the discrete areas do not match the results from the activity-focused assessment step.

10. A method for designing and building a manufacturing system, comprising the steps of:
 reviewing a manufacturing system design based on design review data corresponding to a specification for the manufacturing system;
 identifying activities and consequences corresponding to the design analysis data that are associated with the operation and maintenance of the manufacturing system;
 generating individual activity/consequence pairs by matching each activity with at least one associated consequence;
 generating an action for each individual activity/consequence pair;
 building the manufacturing system based on the design analysis data from the identifying step and the actions from the generating step;
 and validating the presence of the actions in the manufacturing system based on the design analysis data and the actions.

11. The method of claim 10, wherein the reviewing step is conducted at a first time at a pre-design stage, a second time at a detailed design stage, and a third time after the manufacturing system has been built.

12. The method of claim 11, wherein the method further comprises reviewing an alternative design approach during at least one of the pre-design stage and the detailed design stage.

13. The method of claim 10, wherein the design analysis data is stored in at least one of a common analysis template and a program-specific analysis tool.

14. The method of claim 13, wherein at least one of the common analysis template and the program specific analysis tool obtains information from a global specification having core design requirements.

15. The method of claim 13, wherein the common analysis template includes "best practices" information.

16. The method of claim 10, wherein the step of generating an optimized action includes the steps of:
 evaluating each activity/consequence pair by considering at least one of a plurality of evaluation questions.

17. The method of claim 16, further comprising the step of analyzing the information obtained from the evaluating step and selecting a solution according to a hierarchy of possible actions, wherein the hierarchy ranks possible solutions from most optimal to least optimal.

18. The method of claim 17, wherein the analyzing step is conducted using software.

19. The method of claim 10, further comprising the step of generating a activity-focused assessment summary listing the action associated with each individual activity/consequence pair from the generating step.

20. The method of claim 19, wherein the validating step includes checking the manufacturing system with the optimized actions in the activity-focused assessment summary to confirm that the optimized actions have been incorporated into the system.

21. A computer readable storage device used to design and build a manufacturing system, comprising:
 a design analysis tool that includes design analysis data documenting optimized practices for the manufacturing system with respect to at least one system concern; and
 an activity-focused assessment tool that evaluates a plurality of activity/consequence pairs and generates an optimized action corresponding to each individual activity/consequence pair.

22. The computer readable storage device of claim 21, wherein the design analysis data in the design analysis tool is a list of criteria corresponding to manufacturing system requirements described in a global specification.

23. The computer readable storage device of claim 21, wherein the activity-focused assessment tool generates an action for each activity/consequence pair based on a hierarchy of preferred actions.

24. The computer readable storage device of claim 21, wherein the activity-focused analysis tool generates an action summary listing the activity/consequence pairs and the action associated with each individual activity/consequence pair.

25. A computer readable storage device used to design a manufacturing system, comprising a design analysis tool that includes design analysis data documenting optimized practices for the manufacturing system with respect to at least one system concern, wherein the design analysis data in the design analysis tool is a list of criteria corresponding to manufacturing system requirements described in a global specification.

26. A computer readable storage device used to design a manufacturing system, comprising an activity-focused assessment tool that evaluates a plurality of activity/consequence pairs with respect to at least one system concern and generates an action corresponding to each individual activity/consequence pair, wherein the activity-focused assessment tool generates an action for each activity/consequence pair based on a hierarchy of preferred solutions.

27. The computer readable storage device of claim 26, wherein the activity-focused assessment tool generates an action summary listing the activity/consequence pairs and the action associated with each individual activity/consequence pair.

28. A method for designing and building a manufacturing system during a system design, procurement and implementation process, comprising the steps of
 reviewing a manufacturing system design according to safety design analysis data corresponding to a specification for the manufacturing system;
 conducting an activity-focused risk assessment of the manufacturing system design based on safety criteria; and
 validating the manufacturing system based an results from the activity-focused risk assessment after the manufacturing system has been implemented.

29. The method of claim 28, wherein the reviewing step is conducted a plurality of times throughout the manufacturing design, procurement and implementation process.

30. The method of claim 29, wherein the reviewing step includes the steps of:
  conducting a first safety design review at a pre-design stage;
  conducting a second safety design review at a detailed design stage, wherein the second design review is conducted after a manufacturing system supplier has been selected; and
  conducting a third safety design review after the manufacturing system has been built.

31. The method of claim 28, wherein the safety design review data is in the form of at least one of a common safety analysis template and a system-specific safety design analysis tool wherein the safety design analysis tool includes system-specific safety criteria corresponding to the specification for the manufacturing system.

32. The method of claim 31, further comprising the step of updating at least one of the common safety analysis template and the system-specific safety design analysis tool during the reviewing step.

33. The method of claim 32, wherein the conducting step includes the steps of:
  identifying tasks associated with the manufacturing system;
  identifying hazards associated with each task;
  pairing associated tasks and hazards into task/hazard pairs;
  evaluating each task/hazard pair based on predetermined risk assessment criteria; and
  selecting an action for each task/hazard pair.

34. The method of claim 33, wherein the validating step includes the steps of:
  comparing an actual action for each task/hazard in the manufacturing system with its associated action from the selecting step; and
  taking corrective action if the actual action does not match the action from the selecting step.

35. The method of claim 28, wherein the validating step includes the steps of:
  comparing discrete areas of the manufacturing system with the results from the activity-focused risk assessment step; and
  taking corrective action if any of the discrete areas do not match the results from the activity-focused risk assessment step.

36. A computer readable storage device used to design and build a manufacturing system based on safety criteria, comprising:
  a safety design analysis tool that includes safety design analysis data documenting optimized safety practices for the manufacturing system; and
  a task-based risk assessment tool that evaluates a plurality of task/hazard pairs and generates an optimized action corresponding to each individual task/hazard pair.

37. The computer readable storage device of claim 36, wherein the safety design analysis data in the safety design analysis tool is a list of criteria corresponding to safety-related manufacturing system requirements described in a global specification.

38. The computer readable storage device of claim 36, wherein the activity-focused risk assessment tool generates an action for each task/hazard pair based on a hierarchy of preferred solutions.

39. The computer readable storage device of claim 36, wherein the activity-focused risk assessment tool generates an action summary listing the task/hazard pairs and the action associated with each individual task/hazard pair.

40. A computer readable storage device used to design and build a manufacturing system, comprising:
  a safety design analysis tool that includes safety design analysis data documenting optimized safety practices for the manufacturing system,
  wherein the safety design analysis data in the design analysis tool is a list of criteria corresponding to safety related manufacturing system requirements described in a global specification.

41. A computer readable storage device used to design and build a manufacturing system, comprising:
  an activity-focused risk assessment tool that evaluates a plurality of task/wizard pairs and generates an action corresponding to each individual task/hazard pair,
  wherein the activity-focused risk assessment tool generates an action for each task/hazard pair based on a hierarchy of preferred solutions.

42. The computer readable storage device of claim 41, wherein the activity-focused risk assessment tool generates an action summary listing the task/hazard pairs and the action associated with each individual task/hazard pair.

* * * * *